June 3, 1958  C. BRANDON  2,837,277
FLUX TYPE SENSING ELEMENT
Filed Oct. 1, 1953
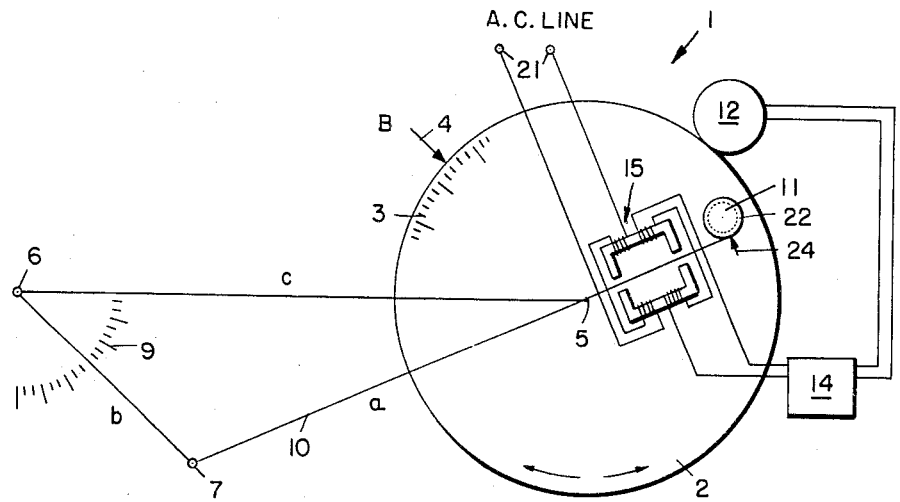
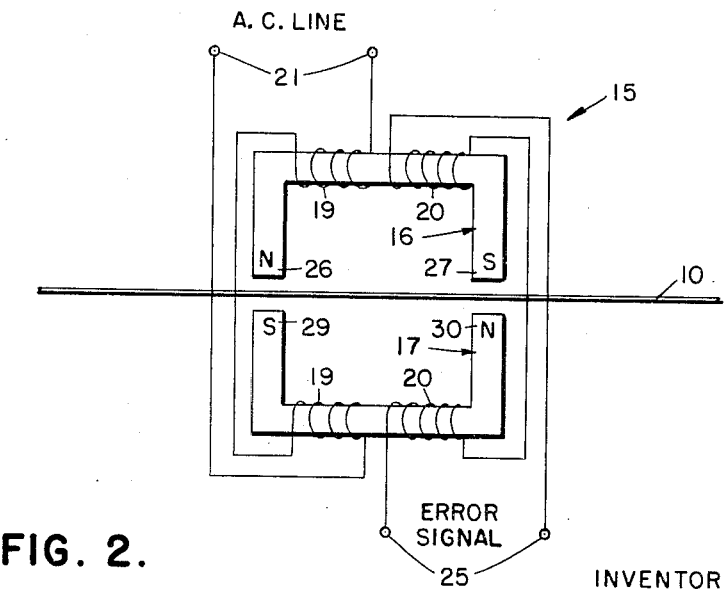
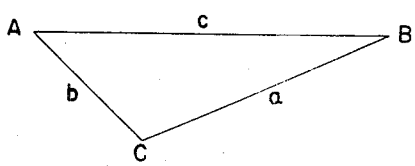
INVENTOR
CHESTER BRANDON
BY
ATTORNEY United States Patent Office 2,837,277
Patented June 3, 1958

2,837,277

FLUX TYPE SENSING ELEMENT

Chester Brandon, La Canada, Calif., assignor to Librascope, Incorporated, Glendale, Calif., a corporation of California Application October 1, 1953, Serial No. 383,602

12 Claims. (Cl. 235—61)

This invention relates to sensing mechanisms and particularly to means for utilizing a magnetic flux sensing device in the solution of problems involving small angles.

The answers to many complicated problems which may be stated in the form of simultaneous equations, such as those involving the relations of spaced objects moving relative to each other, may be arrived at by simulating the problem to scale mechanically and using my novel sensing element in determining simultaneously the length and direction of a vectorial resultant. Two-dimensional problems involving the relations in a triangle, for example, may be determined by reproducing the trigonometry of the involved factors in a plane. Three-dimensional problems may be solved by an analogous simulation in two planes. Such a solution may require finding the proper vector resultant to close a polygon having other known sides and angular relations, and indicating the magnitude and direction of the resultant.

The invention is here shown as embodied in a device for solving a simple triangle. It determines the length and direction of the vector resultant necessary to close the figure by the use of a novel combination involving an electro-magnetic sensing device working in conjunction with a magnetic element forming part of the mechanically simulated triangle, and with a servo mechanism to bring the system into balance. The error signal developed by the sensing element controls the servo mechanism, and the latter adjusts the scalar and angular values representing the unknown in the simulating device to arrive at the proper solution. In the embodiment here shown one side of the triangle is a known value, another side is a computed variable, and the angle included between them may be determined. It is then desired to solve for the side opposite the known angle, and for the angle included between that side and the known side, on the basis of the instantaneous values of the computed side at the instant of the particular solution.

The invention as shown and described is especially suited to the determination in cases where the angular value desired is that of a relatively small acute angle, although it is adaptable to use with larger angles. It is particularly useful for the automatic solution of problems wherein the magnitude and direction of the resultant relative to known vectors must be found for small angles with great accuracy.

The invention has been illustrated in the drawings, in which:

Fig. 1 is a schematic view of a preferred embodiment of the invention;

Fig. 2 is a trigonometric representation of a problem to be solved, and

Fig. 3 is a detailed schematic view of the sensing element of the invention.

The object of the invention is thus primarily to provide means for accomplishing a simultaneous solution for the magnitude and direction of a vectorial unknown.

Another object is to provide sensing means for determining relatively small positional variations.

A further object is to provide a mechanical solution for problems involved in the relative movements of a plurality of independent objects in a two-dimensional frame of reference.

Another object is to provide mechanism for such a solution in a form applicable to the solution of problems in a three-dimensional frame of reference.

A still further object is to provide electro-mechanical means for detecting small positional variations in a device for simulating a problem to scale, and for correlating the variables involved in arriving at and indicating the correct solution.

These and other objects will appear from the detailed description following.

An example of the trigonometric relations involved in a problem of the general type the invention will solve may be seen in Fig. 2, where a triangle with vertices and the adjacent interior angles, A, B and C is represented, having corresponding opposite sides, $a$, $b$ and $c$. The known angle A is bounded on one side by the known side $c$, and on the other side by the computed side $b$. Angle A is substantially fixed, so that it is assumed constant, as is side $c$, at any instant during the solution. The side $b$ may be varying, but its value is continually supplied from other computing equipment, and is effectively a constant at any particular instant. Angle B and side $a$ are to be found.

The usual mathematical treatment for such a problem involves two simultaneous equations, which may be developed easily from Fig. 2, but which are not suscepticle of easy solution in numerical terms. The invention provides means for readily finding the values of $a$ and B on the basis of the constant and computed values, using the sensing element and associated equipment illustrated.

Side $c$ and angle A are simulated to scale, the reference point for the fixed end of the former being the center of a rotatable table. The length of side $b$ is continually adjusted to correspond with computations supplied by other equipment. A hypothetical vectorial resultant simulated by a non-extensible, longitudinally-extending, flexible, magnetic cable representing side $a$ is then led from the free end of side $b$ to a spring-loaded takeup reel mounted on a rotating table. The cable is passed through the sensing element, which is arranged to produce a corrective rotation of the table if the cable does not close the triangle ABC by passing over the vertex B at the table center. When the table has been rotated enough to make side $a$ join side $c$ exactly at the vertex B, the values of the hypothetical and true resultant vectors are identical, and the angle B may be read on a scale showing the number of degrees through which the table has rotated with reference to the known side $c$. The length of side $a$ may then be read against the takeup reel scale, which is calibrated to read the length of the cable from the center of the table to the point of anchorage of the cable at the end of side $b$.

As shown in schematic form in Fig. 1, the device, generally indicated as 1, has a table 2 with a graduated scale 3 to act as an angular value-registering device when read against a fixed index 4. The table 2 is rotatably mounted on an axis 5 representing the apex B of the triangle.

Means 6 adjustable with reference to the axis 5 are provided for registering, or inserting into the device 1, scaled values representative of the known side $c$.

A second means 7 adjustable with reference to the axis 5 is provided for registering into the device values representative of the instantaneous length of the second side $b$ of the triangle. Means 7 are adjustable continuously with reference to means 6, so that the distance from 6 to 7 at all times represents the computed side $b$.

Adjustable means associated with said first and second means are arranged to register values of the known angle A. These adjustable means may include, for example, a graduated scale 9 having its origin at the side c, the value of angle A being read at the intersection with scale 9 of the side b.

The third side of the triangle, a, is simulated by a longitudinally-extending element 10 of non-extensible but flexible magnetic material. One end of the magnetic element 10 is secured to said second adjustable means 7, and the other is adjustably anchored to table 2 by means of a spring-loaded takeup reel 11.

The device is so arranged that the magnetic element 10 will normally close the ABC triangle by passing from second means 7 to the takeup reel 11 directly over the table axis 5. If it does not, the variation or divergence of this hypothetical resultant, from the true resultant produces an error signal, and means are provided to rotate the table until it reaches this position of exact correspondence.

The rotation is effected by means of a servo-motor 12 operated through an amplifier 14 under the control in direction and amount of a magnetic sensing element, indicated generally as 15. The sensing element 15 consists of a pair of U-shaped magnetic core members 16 and 17 mounted on the table 2 on opposite sides of the longitudinally-extending magnetic element 10.

Each of the magnetic core members 16 and 17 has wound thereon a main winding 19 and a control winding 20. The main windings 19 are connected together and energized from a conventional A.-C. source 21. The control windings 20 are connected together and arranged so that error potentials or signals induced therein will control the direction in which the motor 12 is actuated.

The longitudinally-extending magnetic element 10 is anchored in, and arranged to be taken up by, the spring reel 11. This permits simulation of any desired length of side a. A suitably calibrated scale 22 on the takeup reel 11 may be read against a fixed index 24 to register the exact length of side a when the magnetic element 10 has been centered over the table axis 5 to close the triangle.

At the same time, the angle A is registered on the scale 9 associated with the table 2.

It will be seen that if the magnetic member 10 passes exactly through the center of the space between the opposed pole tips, the reluctance of the magnetic circuit through that member and the U-shaped magnetic core member 16 will be identical with that through the path including the other U-shaped core member 17. Hence no out-of-phase currents will be induced in the control windings 20. If, however, the spacing between member 10 and the pole tips 26, 27 is not the same as that between member 10 and the pole tips 29, 30, the reluctances of the magnetic circuits through cores 16 and 17 will differ, and directional control signals will be induced in windings 20. These signals, after strengthening in amplifier 14, will be effective, through the servomotor 12, to rotate the table 2 until the magnetic member 10 is exactly centered over the table axis 5. A null error signal will then result. At this instant the triangle has been closed and the measured solution values may be read for angle B on the table graduations opposite the index pointer 22, and for the side a on the scale graduations opposite the index 29 on the takeup reel.

A solution is thus obtained for the length and direction of the vectorial resultant at the same time. It will be seen that the instrument may be modified to solve problems involving an additional variable quantity by adding an additional sensing element operating normally to the first. Thus the magnetic element 10 may be servoed also to a null position in a direction parallel to the axis of table 2 to solve for the length and direction of a three-dimensional vectorial quantity where small angles are involved.

While the invention has been shown as embodied in a device for solving a triangle, it will be readily seen that a polygon having any number of known sides may be simulated. In any case, the magnetic element 10 represents the vectorial unknown or resultant, and will be connected between the last in sequence of the additional sides and the axis 5 of the angular value-registering device.

I claim:

1. An angular value-registering device rotatably mounted on an axis, representing one apex of a triangle, means adjustable with reference to said axis for registering a value representative of the known length of one side of said triangle, a second means adjustable with reference to said axis for registering a value representative of the instantaneous length of a second side of said triangle, adjustable means for registering a value representative of the known value of the angle between the said one side and said second side of said triangle, means for simulating a third side of said triangle, comprising a longitudinally-extending magnetic element connected at one end to said second adjustable means and at its opposite end to anchoring means carried by said rotatably mounted angular value-registering device, said element normally extending along a line intersecting the axis upon which said angular value-registering device is rotatably mounted, means for rotating said angular value-registering device, comprising a servomotor, means for controlling said servomotor, comprising a pair of magnetic cores carried by said rotatably mounted angular value-registering device and disposed one on each side of said magnetic element between the anchored end thereof and the axis of said rotatably mounted angular value-registering device, energized windings on said cores, control windings on said cores, means inter-connecting said control windings and said servomotor for controlling operation of said motor in accordance with the error signals induced in said control windings, and means associated with said anchoring means for registering the length of said simulated third side when said magnetic element is intersecting the axis upon which said angular value-registering device is rotatably mounted.

2. The combination, in a device for determining the magnitude and direction of a vectorial resultant, of angular value-registering means rotatably mounted about an axis representing one apex of a polygon, first means adjustable with reference to said axis for registering a value representative of the known length and direction of a first side of said polygon, a second means adjustable with reference to said axis for registering a value representative of the instantaneous length of a second side of said polygon, adjustable means for registering a value representative of the known angle between said first and second sides of said polygon, means for simulating a third side of said polygon, comprising a longitudinally-extending flexible magnetic element connected at one end to said second adjustable means and at its opposite end to extensible anchoring means carried by said rotatably mounted angular value-registering device, said element extending normally along a line intersecting the axis upon which said angular value-registering device is rotatably mounted, means for rotating said angular value-registering device, comprising a servomotor, and means for controlling said servomotor, comprising a pair of magnetic cores carried by said rotatably mounted angular value-registering device, main windings disposed on said cores and arranged to be energized by a suitable source, control windings disposed on said cores and arranged to have error signals induced therein related to positional variations in said longitudinally-extending magnetic element relative to said cores, and means interconnecting said control windings and said servomotor for controlling operation of said motor in accordance with error signals induced in said control windings.

3. In a device for simultaneously solving for the direction and magnitude of a vectorial value, an angular value-registering device rotatably mounted about an axis representing one apex of a triangle, first means adjustable with reference to said axis for registering a value representative of the known length of one side of said triangle, a second means adjustable wih reference to said axis for registering a value representative of the instantaneous length of a second side of said triangle, adjustable means for registering a value representative of the known value of the angle betwen the said one side and said second side of said triangle, and means for simulating a third side of said triangle, comprising a longitudinally-extending magnetic element, connected at one end to said second adjustable means, and at its opposite end to anchoring means carried by said rotatably mounted angular value-registering device, said element normally extending along a line intersecting the axis upon which said angular value-registering device is rotatably mounted, means for rotating said angular value-registering device, comprising a servomotor and means for controlling said servomotor, comprising a pair of magnetic cores carried by said rotatably mounted angular value-registering device and disposed one on each side of said magnetic element, main windings disposed on said cores and arranged to be energized by a suitable source, control windings disposed on said cores and arranged to have error signals induced therein, and means interconnecting said control windings and said servo motor for controlling operation of said motor in accordance with the error signals induced in said control windings.

4. In a device for solving triangles, means for simulating a pair of known legs and the angle included therebetween, means including a magnetic member for simulating a third leg, means including a magnetically-responsive error sensor and a servo-motor operable by signals from said error sensor upon divergence of said third leg from a position representing a closure with said known legs to effectuate a relative movement between said magnetic member and said error sensor to a position of closure of said triangle; means for indicating the angle between said known and said magnetic legs, and means for indicating the length of said magnetic leg, when such closure has been effected.

5. In a device for solving for the magnitude and direction of a vectorial resultant, a rotatable table, a flexible magnetic member extending across at least a portion of said table, take-up and measuring means for said flexible member disposed on said table, spaced magnetic members disposed on said table on opposite sides of said flexible member, at least a pair of windings disposed on said spaced magnetic members to develop an error-potential whenever said flexible member is closer to one of said spaced magnetic members than to the other, and servo means arranged to receive said error potential and to rotate said table in a direction to minimize said error potential.

6. Apparatus for determining unknown quantities in a triangle, including means for simulating a first leg, means for simulating a second leg and the angle between the first and second legs, a control member extending from the end point of said second leg for intersection with the first leg, a rotary member, an error sensor including the control member and disposed on the rotary member for movement with the rotary member, and means including a servo-motor for driving the rotary member in accordance with the signals from the error sensor to dispose the control member for intersection with the first leg.

7. Apparatus as set forth in claim 6 in which the control member is a linear member having magnetic proporeties, and in which the error sensor includes a pair of core members each associated with the linear member to produce a signal having an amplitude dependent upon the relative positioning between the control member and the core members, and in which means are included to detect any difference in the amplitudes of the signals produced by the core member for introduction of the difference signal to the servo-motor.

8. Apparatus for determining unknown quantities in a triangle, including means for providing an indication of the length of a first side, means for providing an indication of the angle between the first side and a second side and the length of the second side, a rotary member, a magnetic tape extending from the apex of the second side in intersecting relationship to the first side, a magnetic error generator disposed on the rotary member to provide an error signal in accordance with the positioning of the magnetic tape relative to the apex of the first side, and means operative by the error signal to drive the rotary member in a direction to minimize the error signal.

9. Apparatus for determining unknown quantities in a polygon having a plurality of sides of known length and a single side of unknown length, including means for simulating the end points at which two of said known sides intersect said unknown side when said figure is closed, a rotary member, magnetic sensing means disposed on the rotary member for rotary movement with the member, means for simulating said single unkonwn side comprising a magnetic tape threading the sensing means to produce error signals in accordance with the positioning of the tape relative to the sensing means, means for fixing one end of the tape in accordance with the end point of a first one of the known polygonal sides, and means including a servo-motor for rotating the rotary member to minimize the error signals upon an adjustment in the relative disposition of the tape and the magnetic sensing means to produce an intersection between the tape and the end point in a second one of the known polygonal sides.

10. Apparatus as set forth in claim 9, including means for indicating the relative angular positioning of the tape and means for indicating the distance along the tape between the end points of the first and second polygonal sides.

11. Apparatus for determining unknown quantities in a polygon having a plurality of sides of known length and a single side of unknown length, including means for simulating the end point at which two of said known sides intersect said unknown side when said figure is closed, means for simulating said single unknown side comprising a linear coupling member, a rotary member, sensing means disposed on the rotary member for movement with the member and constructed to pass the coupling member through the sensing means, the sensing means including means for producing error signals in accordance with the direction of passage of the coupling member through the sensing means, means for fixedly positioning one end of the coupling member at a point corresponding to the position of the end point of one of the known polygonal sides, means on the rotary member for receiving the other end of the coupling member to vary the length of the coupling member upon a rotation of the rotary member, means for fixedly positioning an end point of a second polygonal side at the center of the rotary member, and means including a servo-motor for driving the rotary member in a direction to minimize the error signal for the passage of the coupling member through the center of the rotary member.

12. Apparatus as set forth in claim 11, including means for indicating the relative angular positioning of the coupling member, and means for indicating the distance along the linear coupling member between the end points of the first and second polygonal sides.

References Cited in the file of this patent

UNITED STATES PATENTS

| | | |
|---|---|---|
| 1,268,620 | Renstrom | June 4, 1918 |
| 2,293,502 | Hermann | Aug. 18, 1942 |
| 2,503,721 | Angell | Apr. 11, 1950 |
| 2,567,984 | Wood | Sept. 18, 1951 |